United States Patent
Hsu et al.

(10) Patent No.: US 10,921,876 B2
(45) Date of Patent: Feb. 16, 2021

(54) RUNTIME POWER TABLE INDEX ADJUSTMENT FOR PERFORMANCE AND POWER MANAGEMENT

(71) Applicant: MediaTek Inc., Hsinchu (TW)

(72) Inventors: Jih-Ming Hsu, Hsinchu (TW); Tai-Hua Lu, Hsinchu (TW); Pei-Yu Huang, Hsinchu (TW); Chien-Yuan Lai, Hsinchu (TW); Shu-Hsuan Chou, Hsinchu (TW); I-Cheng Cheng, Hsinchu (TW); Yun-Ching Li, Hsinchu (TW); Ming Hsien Lee, Hsinchu (TW)

(73) Assignee: MediaTek Inc., Hsinchu (TW)

(*) Notice: Subject to any disclaimer, the term of this patent is extended or adjusted under 35 U.S.C. 154(b) by 282 days.

(21) Appl. No.: 15/963,307

(22) Filed: Apr. 26, 2018

(65) Prior Publication Data

US 2019/0332157 A1    Oct. 31, 2019

(51) Int. Cl.
*G06F 1/329* (2019.01)
*G06F 1/3203* (2019.01)
*G06F 1/3209* (2019.01)
*G06F 1/3206* (2019.01)

(52) U.S. Cl.
CPC ............ *G06F 1/329* (2013.01); *G06F 1/3203* (2013.01); *G06F 1/3206* (2013.01)

(58) Field of Classification Search
CPC ....... G06F 1/329; G06F 1/3206; G06F 1/3203
See application file for complete search history.

(56) References Cited

U.S. PATENT DOCUMENTS

| | | | |
|---|---|---|---|
| 9,665,161 B2 | 5/2017 | Hsu et al. | |
| 2002/0049920 A1* | 4/2002 | Staiger ................. | G06F 1/3203 713/340 |
| 2009/0077407 A1* | 3/2009 | Akimoto ................ | G06F 1/26 713/340 |
| 2013/0139170 A1* | 5/2013 | Prabhakar ............ | G06F 9/4893 718/104 |
| 2016/0342198 A1 | 11/2016 | Hsu et al. | |
| 2017/0083383 A1* | 3/2017 | Rider .................... | G06F 9/5094 |

\* cited by examiner

*Primary Examiner* — Jaweed A Abbaszadeh
*Assistant Examiner* — Gayathri Sampath
(74) *Attorney, Agent, or Firm* — Tong J. Lee

(57) ABSTRACT

Power and performance of a multi-core system is managed dynamically by adjusting power table indices at runtime. Runtime statistics is measured, when an application is executed on a first core of a first type at a first operating point (OPP) in a first time period, and on a second core of a second core type at a second OPP in a second time period. A controller estimates, based on the runtime statistics, a first pair of indices associated with a first OPP for the first core and a second pair of indices associated with a second OPP for the second core. During runtime, the controller incorporates the first pair of indices and the second pair of indices into power table indices; and determines, from the power table indices, selected indices associated with a selected OPP of a core of a selected core type for executing the application.

20 Claims, 6 Drawing Sheets

Power Table 150

|  | 1st column 211 | 2nd column 212 | 3rd column 213 | 4th column 214 |
|---|---|---|---|---|
| Core_0 | V | F | PW | PF |
| OPP_0 | V00 | F00 | PW00 | PF00 |
| OPP_1 | V01 | F01 | PW01 | PF01 |
| OPP_2 | V02 | F02 | PW02 | PF02 |
| ⋮ | ⋮ | ⋮ | ⋮ | ⋮ |
| OPP_N | V0N | F0N | PW0N | PF0N |
| Core_1 |  |  |  |  |
| OPP_0 | V10 | F10 | PW10 | PF10 |
| OPP_1 | V11 | F11 | PW11 | PF11 |
| OPP_2 | V12 | F12 | PW12 | PF12 |
| ⋮ | ⋮ | ⋮ | ⋮ | ⋮ |
| OPP_N | V1N | F1N | PW1N | PF1N |

First Segment 210 (rows Core_0 through OPP_N)
Second Segment 230 (rows Core_1 through OPP_N)

FIG. 2

RUNTIME POWER TABLE INDEX ADJUSTMENT FOR PERFORMANCE AND POWER MANAGEMENT

TECHNICAL FIELD

Embodiments of the invention relate to a mechanism for controlling and optimizing the performance and power of a multi-core computing systems.

BACKGROUND

Dynamic voltage and frequency scaling (DVFS) is a technique that automatically adjusts the frequency and voltage of a processor at runtime. An increase in the operating frequency and voltage of a processor can ramp up the computing performance. However, this increase means that power consumption of the processor also increases, as the power consumption in an integrated circuit is computed as: $P = C \times V^2 \times F$, where P is the power, C is the capacitance being switched per clock cycle, V is the voltage and F is the frequency. Some modern computer systems have a built-in management framework to manage the tradeoff between performance and power consumption. For example, the management framework may include a power controller that determines at runtime whether to increase or decrease operating frequency in order to satisfy system performance requirements or to save power.

A multi-core computing system as described herein has multiple clusters of processor cores, also referred to as cores. Each clusters include cores of the same core type. The cores in two different clusters may be different. A non-limiting example is the Arm® big.LITTLE™ system in which one cluster is composed of "big cores" and another cluster is composed of "little cores." During system runtime, the power and performance management framework of the multi-core computing system dynamically determines whether to turn on or off each core, and sets the operating frequency and voltage for each cluster (or each core) that is turned on. The power and performance management framework needs to take into consideration both power consumption and performance of each core type.

One example of such a multi-core computing system is a mobile device. A mobile devices generally have limited battery power and thermal envelope. Therefore, mobile devices need to provide high energy efficiency to meet performance requirements and low power consumption to meet the thermal limit at the same time.

SUMMARY

In one embodiment, a multi-core system is provided for dynamically managing power and performance. The multi-core system comprises: a plurality of cores of at least a first core type and a second core type; a plurality of monitors to measure runtime statistics of executing an application: in a first time period on a first core of a first type at a first operating point, and in a second time period on a second core of a second core type at a second operating point; memory to store a power table; and a controller. The controller is operative to estimate, based on the runtime statistics, a first pair of indices associated with a first operating point for the first core and a second pair of indices associated with a second operating point for the second core. Each of the first operating point and the second operating point is defined by a frequency and a voltage, and each of the first pair of indices and the second pair of indices includes a performance index and a power index. The controller incorporates, during runtime, the first pair of indices and the second pair of indices into power table indices; and determines, from the power table indices, a selected pair of indices that is associated with a selected operating point of a core of a selected core type for executing the application. The selected pair of indices satisfies power and performance requirements.

In another embodiment, a method is provided for dynamically managing power and performance in a multi-core system including cores of at least a first core type and a second core type. The method comprises measuring runtime statistics of executing an application: in a first time period on the first core at a first operating point, and in a second time period on the second core at a second operating point. The method further comprises estimating, based on the runtime statistics, a first pair of indices associated with a first operating point for the first core and a second pair of indices associated with a second operating point for the second core. Each of the first operating point and the second operating point is defined by a frequency and a voltage, and each of the first pair of indices and the second pair of indices includes a performance index and a power index. The method further comprises: incorporating, during runtime, the first pair of indices and the second pair of indices into power table indices; and determining, from the power table indices, a selected pair of indices that is associated with a selected operating point of a core of a selected core type for executing the application. The selected pair of indices satisfies power and performance requirements.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 2 illustrates a power table according to one embodiment.

DETAILED DESCRIPTION

Figure 1:
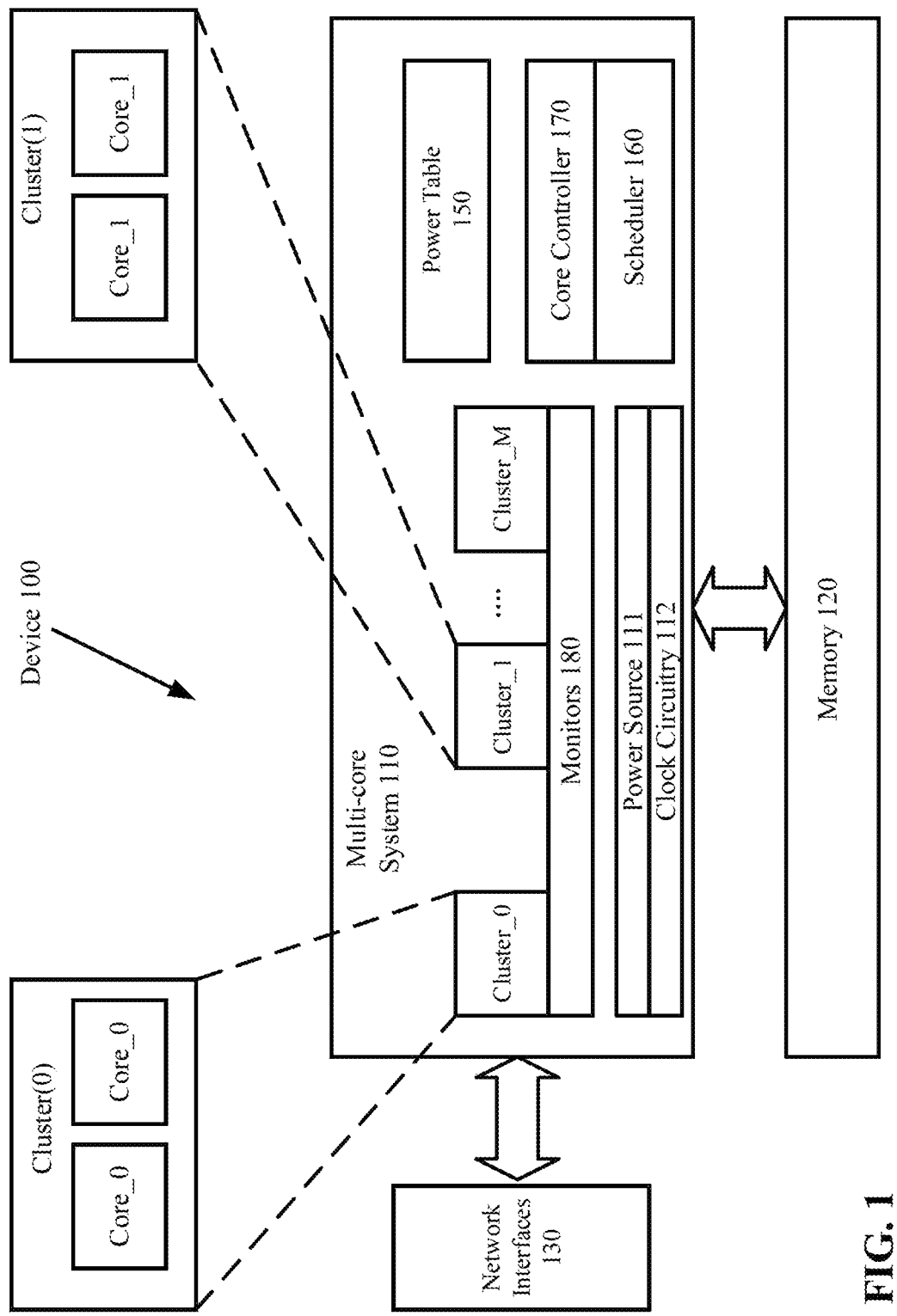
FIG. 1 illustrates a device including a multi-core system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a runtime mechanism for dynamically adjusting power table indices according to runtime statistics of an application. The adjusted table indices enable a scheduler to select a core and an operating point (OPP) for executing the application with maximal energy efficiency subject to performance and power requirements. It should be understood that the term "power table" hereinafter encompasses any data structure which, for a given core type, correlates a combination of data including at least the following: a voltage, a frequency, a performance index and a power index. A scheduler may select, based on the power table indices, a core type and one combination under the core type to execute an application.

The performance indices and the power indices in the power table for a given core may be determined by the given core executing benchmark applications. However, a core operating at an operating point may have difference performance and power consumption when executing different applications. The runtime mechanism described herein uses runtime measurements of a task or an application to adjust the power indices and performance indices. In one embodiment, an application may include a recurring task, which wakes up periodically or intermittently. The power table indices may be adjusted according to the runtime statistics of the application or task. According to the adjusted power table indices, a scheduler may select a core (or cores) and an operating point for executing the task when the task wakes up next time to be executed, thereby satisfying the required performance and minimizing power consumption (i.e., maximizing energy efficiency).

The term "power table index" as used herein refers to either a power index or a performance index, and the term "power table indices" refers to power indices and performance indices collectively. In a first embodiment, a system may calculate an adjustment to a power table index and dynamically update the index stored in the power table. The updated power table content is then used for power and performance management. In a second embodiment, a system may read an index from a power table, apply the calculated adjustment (e.g., a scaling factor) to the index and use adjusted index for power and performance management without modifying the index stored in the power table. The description of "power table index adjustment" hereinafter applies to both the first embodiment and the second embodiment, where one or more power table indices are adjusted for power and performance management use while the content stored in the power table may or may not be modified.

FIG. 1 illustrates an example of a device 100 in which embodiments of the invention may operate. The device 100 includes a multi-core system 110, which has a heterogeneous processing architecture that perform Heterogeneous Multi-Processing (HMP). The multi-core system 110 uses two or more types of cores arranged in two or more clusters (e.g., cluster 0, cluster_1, ..., cluster M), where M may be any positive integer. Although two cores are shown in each of cluster_0 and cluster_1, each cluster may include more than two cores and different clusters may include different number of cores. In one embodiment, the multi-core system 110 is a system-on-a-chip (SOC).

The multi-core system 110 may include two or more core types. Cores in the same cluster have the same core type, and cores in different clusters have different core types. Cores of different core types have different hardware characteristics which may be measured by processing capacities (e.g., measured by million instructions per second (MIPS)) and/or energy efficiency (e.g., measured by power consumption). In one embodiment, a "little" core type may be designed for maximum power efficiency and a "big" core type may be designed to provide maximum compute performance. A core of the "big" core type may have higher power consumption and higher processing capability than another core of the "little" core type. In another embodiment, an additional "middle" core type may be designed to provide medium power efficiency and medium compute performance. The cores of different core types share the same instruction set architecture (ISA); that is, they can execute the same programs and software applications. In one embodiment, the cores of different core types may have different microarchitecture to deliver different compute performance and different power efficiency. In an embodiment of the device 100 that includes only two clusters (e.g., cluster_0 and cluster_1), core_0 may be of the "little" core type, and core_1 may be of the "big" core type. If the device 100 includes three clusters, core_0 may be of the "little" core type, core_1 may be of the "middle" core type and core_2 (in cluster_2, not shown) may be of the "big" core type.

In one embodiment, each of the cores (e.g., core_0s and core_1s) may be a central processing unit (CPU) core, a graphics processing unit (GPU) core, a vector processor core, a digital signal processor, and other general-purpose or special purpose processing circuitry. A core may include arithmetic and logic units (ALUs) and/or other processing circuitry. The device 100 may be a graphics processing device, an entertainment system, a multimedia device, a gaming device, a communication device, a workstation, a desktop computer, a laptop computer, a mobile phone, or any system having multiple cores of different core types.

In the embodiment of FIG. 1, each cluster also has access to a memory 120. The memory 120 may include on-chip and off-chip memory devices such as dynamic random access memory (DRAM), static RAM (SRAM), flash memory and other volatile or non-volatile memory devices. Each cluster receives power from a power source 111 and clock signals from clock circuitry 112. Each cluster also share access to an L2 cache (not shown). In one embodiment, the processing system 110 is coupled to network interfaces 130 to connect to networks (e.g., a personal area network, a local area network, a wide area network, etc.). It is understood the embodiment of FIG. 1 is simplified for illustration purposes. Additional hardware components may be included in the device 100.

In one embodiment, the processing system 110 includes a core controller 170 ("controller") to control the power consumption and performance of the multi-core system 110 to satisfy system performance requirements and power budget. The core controller 170 may dynamically manage the performance and power by determining the number of cores to turn on (i.e., activated) and by controlling the operating point (e.g., the frequency and the voltage) of the activated cores. The core controller 170 may choose the most energy efficient operating point for executing a task according to one or more power tables which store the performance index and the power index of each operating point and each core type. In the following description, the power table(s) is managed for the cores (e.g., core_0s and core_1s) having the same ISA.

In one embodiment, the core controller 170 at runtime may look up a power table 150 to select a core type and an operating point for operating a core of the selected core type. The core controller 170 then configures the power source 111 (e.g., voltage regulators) and the clock circuitry 112 to provide the selected operating point to the core. The multi-core system 110 also includes a scheduler 160 that assigns and schedules tasks among the cores.

In one embodiment, the multi-core system 110 includes a set of monitors 180 (e.g., sensors and counters) to monitor power consumption (e.g., temperature) and performance (e.g., processing time, utilization, etc.) of each core when a given task is executed. According to the output of the monitors 180, the core controller 170 may adjust the power indices and performance indices in the power table 150 for executing the given task.

FIG. 2 illustrates an example of the power table 150 according to one embodiment. In another embodiment, the multi-core system 110 may include multiple power tables, each core type having a corresponding power table. It is understood that power table data entries may be organized differently from what is shown in the power table 150 of FIG. 2, and additional data entries may be included in some embodiments. The power table 150 may be stored in an on-chip memory.

In one embodiment, the power table 150 includes a first segment 210 for a first core type (e.g., the core_0 type) and a second segment 220 for a second core type (e.g., the core_1 type). Additional segments may be included for additional core types. The power table 150 further includes: a first column 211 storing a list of voltages (V), a second column 212 storing a list of frequencies (F), a third column 213 storing a list of power indices (PW) and a fourth column 214 storing a list of performance indices (PF). Each of the segments (210 and 220), when read row-wise as shown, indicates, for each operating point and core type, the corresponding voltage, frequency, power index and performance index. Higher power index indicates higher power consumption, and higher performance index indicates greater processing capacity.

Taking the first segment 210 as an example, the power indices (PW) and performance indices (PF) may be determined by core_0 executing benchmark applications, such as SPECint2K, Dhrystone and the like. However, the actual task to be executed on core_0 may have different characteristics from those of the benchmark applications. Non-limiting examples of the characteristics may include the ratio of floating point operation count to integer operation count per second, cache hit rate, memory throughout (e.g., the number of memory access per second), etc. According to embodiments of the invention, the contents of the power table 150 may be dynamically adjusted at runtime according to the characteristics of the task to be executed.

In another embodiment, the power table 150 may additionally include the number of activated cores of each core type. For example, in a system with two clusters (core_0s in cluster 0 and core_1s in cluster_1), a power table may correlate a combination of the following: the number of activated core_0, the voltage and the frequency of core_0, the number of activated core_1, the voltage and the frequency of core_1, a performance index and a power index. A scheduler may select one combination in the power table that satisfies power and performance requirements for executing a task. The selected combination may include multiple cores of the same core type or different core types. In the description herein, the power table 150 of FIG. 2 is used as an example; however, it is understood that the dynamic power table adjustment mechanism may be applied to power tables that include additional data entries.

Figures 3, 4:
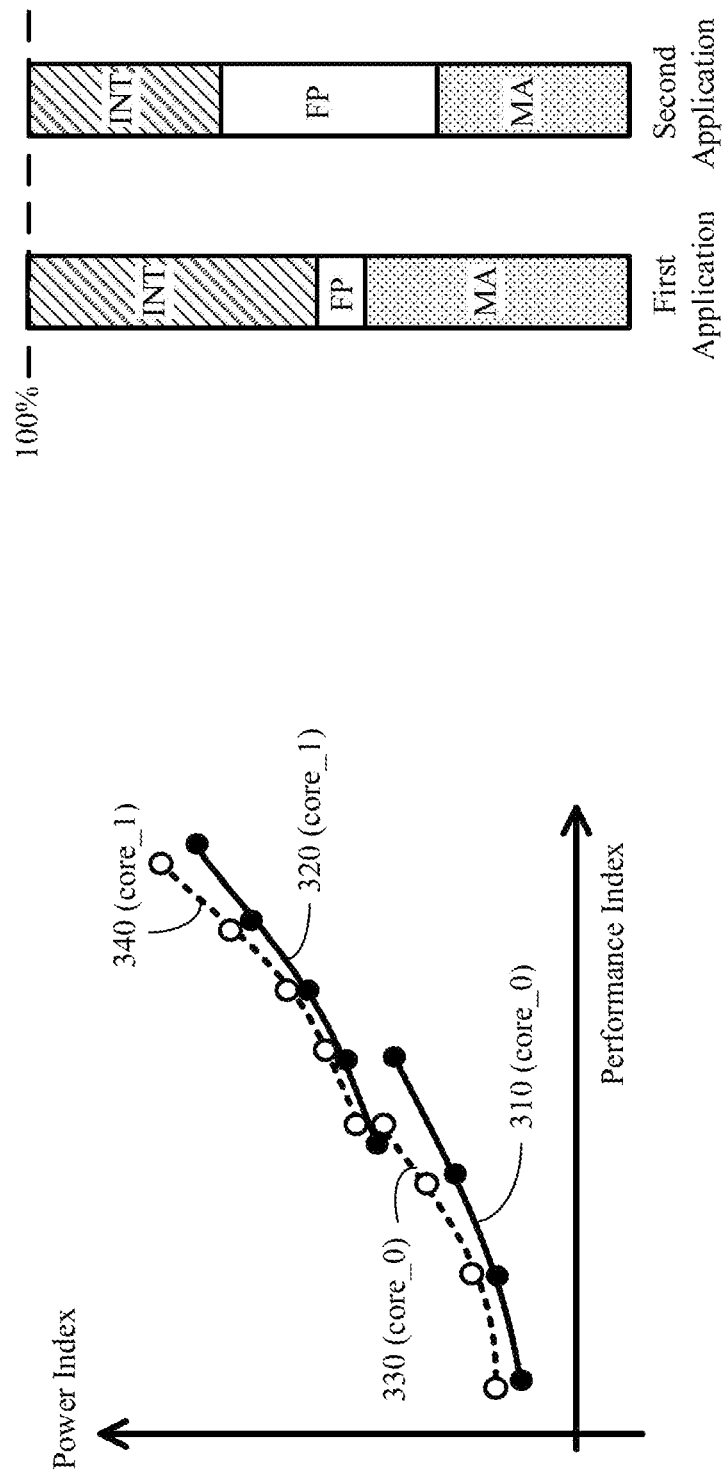
FIG. 3 illustrates performance index vs. power index curves for different applications and different core types according to one embodiment.
FIG. 4 illustrates different instruction mix for different applications according to one embodiment.

FIG. 3 illustrates a graphical representation of power index vs. performance index for core_0 and core_1 according to one embodiment. Curves 310-340 are a graphical representation of the power table 150 of FIG. 2. The graphical representation more clearly illustrates the impact on power and performance of different cores when the cores execute different applications.

In this example, solid curves 310 and 320 represent the power index vs. the performance index curves for core_0 and core_1, respectively, when each core executes a first application. Dotted curves 330 and 340 represent the power index vs. the performance index curves for core_0 and core_1, respectively, when each core executes a second application. The circles on the curves 310-340 represent operating points. For core_0, each operating point on curve 310 and a corresponding operating point on curve 330 have the same voltage and frequency; e.g., the leftmost operating points on curves 310 and 330 have the same voltage and frequency, the second leftmost operating points on curves 310 and 330 have the same voltage and frequency, and so on. The same applies to the operating points on curves 320 and 340 for core_1. FIG. 3 shows that the power index vs. the performance index curves may be different (e.g., shifted vertically and/or horizontally, different in slopes and/or shapes, etc.) when the same core executes different applications. The positions of the same operating point on the curves (between a solid curve and a dotted curve of the same core), with respect to the corresponding power and performance indices, may be different for different applications. Furthermore, the relative positions of the two curves for core_0 and core_1 (e.g., the two solid curves or the two dotted curves) may be different; e.g., the two solid curves 210 and 320 have a wider gap in between than the two dotted curves 330 and 340.

FIG. 4 illustrates a number of the different characteristics between two applications (e.g., a first application and a second application) according to one embodiment. When normalized to 100%, the first application contains 40% of integer instructions (INT), 10% of floating point instructions (FP), and 50% of memory access instructions (MA). Similarly normalized to 100%, the second application contains 30% of integer instructions, 40% of floating point instructions, and 30% of memory access instructions. A memory access instruction is a read or write instruction that accesses the memory (instead of or in addition to the cache access). Different mix of instructions have different impact on the power and performance of a core. Instead of using a power table having fixed power and performance indices for all applications, the multi-core system 110 (FIG. 1) dynamically adjusts these indices according to the characteristics of the applications executed by the cores. In one embodiment, the different characteristics may be measured and collected by the monitors 180 (FIG. 1) as runtime statistics.

Figure 5:
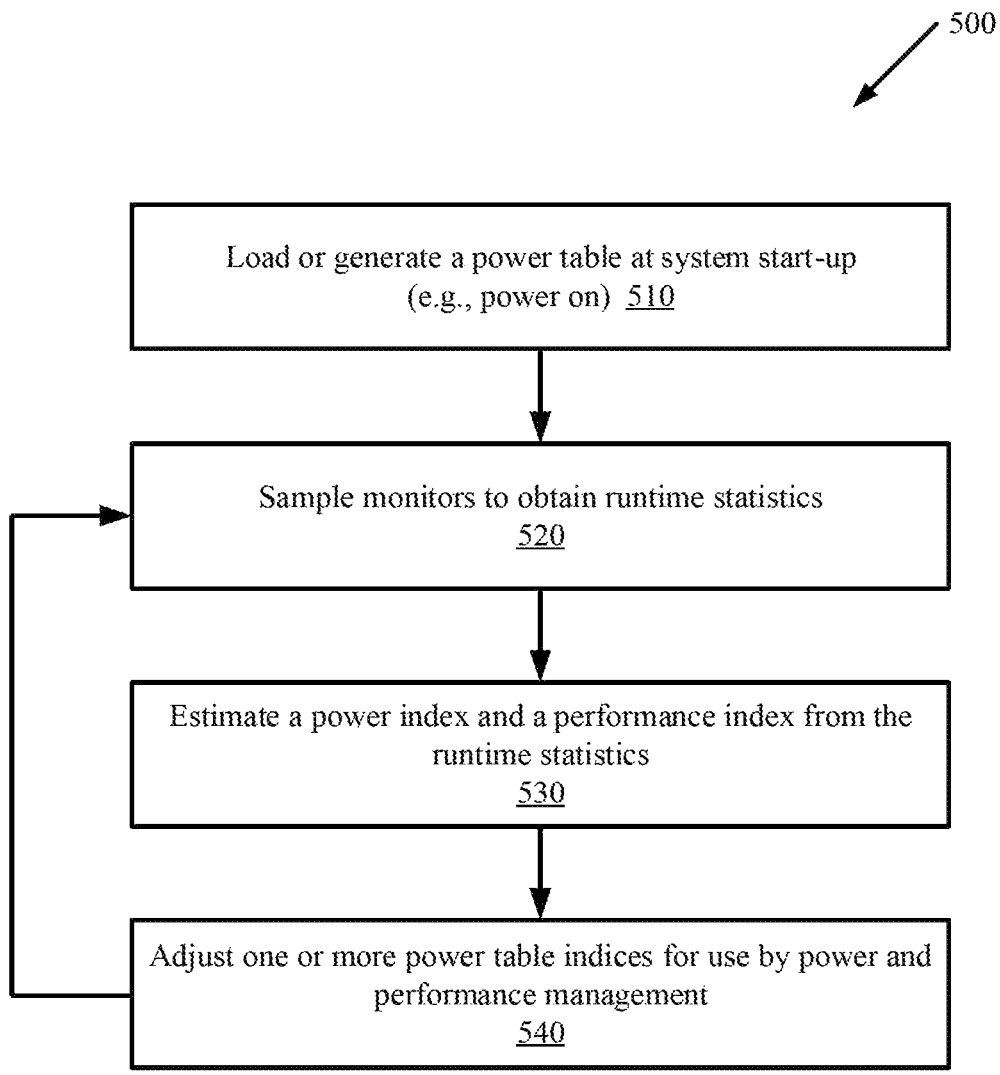
FIG. 5 is a flow diagram illustrating a process for adjusting power table indices according to an embodiment.

FIG. 5 is a flow diagram illustrating a method 500 for power table index adjustment according to one embodiment. The method 500 may be performed by the multi-core system 110 of FIG. 1. Referring also to FIG. 1, when the multi-core system 110 starts up (e.g., powers on) at system boot time at step 510, the system 110 generates the power table 150 according to a predetermined process; alternatively, the system 110 may load the (predetermined) power table 150 from storage into the on-chip memory. At runtime when a core (or cores) executes an application at an operating point at step 520, the monitors 180 are periodically sampled to determine, for each sampling cycle, the runtime statistics. In one embodiment, the runtime statistics may include: the number of floating point instructions (#FP), the number of integer instructions (#INT) and memory throughput (THR), which may be estimated from the amount of memory activities, such as the number of memory access instructions. Based on these numbers, the controller 170 at step 530 estimates a power index and a performance index for the core (or cores) executing the application at an operating point, and at step 540 adjusts one or more power table indices (e.g., the power index and the performance index) for use by power and performance management. The system 110 then returns to step 520 to sample the monitors 180 in the next sampling cycle.

In one embodiment, a power index is associated with an operating point, an application, and a core type for single core execution. In one embodiment, a power index (PW) can be estimated by a power index function: PW=F1(PW_per_INT_Inst)×(#INT), (PW_per_FP_Inst)×(#FP), (PW_per_MA_Inst)×(THR)), where F1 is a mathematical function including a combination of runtime measurements and offline calibrated parameter. PW_per_INT_Inst, PW_per_FP_Inst and PW_per_MA_Inst represent the per-instruction power consumption for an integer instruction, a floating point instruction and a memory access instruction, respectively. The per-instruction power consumption numbers can be estimated by a combination of runtime measurements and offline calibrated parameters. For example, the number of instructions per sampling cycle (IPC) for a core type, which is a function of the operating frequency, can be measured at runtime. Offline calibration may provide a relationship (e.g., a per-instruction formula) between the IPC and the power consumption for each core type and each instruction type (e.g., an integer instruction, a floating point instruction or a memory access instruction). The per-instruction formula may include offline calibrated parameters predetermined for an application, an instruction type and a core type. In one embodiment, the power index may be calculated by first applying the per-instruction formula to the IPC and the offline calibrated parameters to calculate the per-instruction power consumption, and then by applying the power index formula to the per-instruction power consumption and the runtime statistics #INT, #FP and THR. The system may repeat the power index calculations for different operating points of the same core type, and for operating points of one or more different core types. The system may also repeat the power index calculations for the application executed by multiple cores.

Similarly, a performance index is associated with an operating point, an application, and a core type for single core execution. A performance indices (PF) can be estimated by a performance index formula that includes the runtime statistics of cache hit rate (e.g., L2 cache hit rate "Hit_Rate"), the memory throughput, the IPC for each core type, and offline calibrated parameters. In one embodiment, PF may be a function of (Hit_Rate)×(IPC) and (1−Hit_Rate)×(THR); e.g., PF=F2((Hit_Rate)×(IPC), (1−Hit_Rate)×(THR)), where F2 is a mathematical function. For example, F2 may be a linear function and PF=a×(Hit_Rate)×(IPC)+b×(1−Hit_Rate)×(THR). The parameters a and b used in the linear function may be calibrated offline. Applying the performance index formula to the runtime statistics (e.g., Hit_Rate, THR and IPC) measured when a given core executes an application produces a power index for a given operating point of the given core executing the application. The system may repeat the performance index calculations for different operating points of the same core type, and for different operating points of one or more different core types. The system may also repeat the performance index calculations for the application executed by multiple cores.

The power index formula, the per-instruction formula and the performance index formula may be collectively referred to as a formulation. Thus, the system may apply the formulation with a first set of offline calibrated parameters predetermined for an application and core_0, to the runtime statistics measured when core_0 executes the application to obtain a power index and a performance index. The system may also apply the formulation with a second set of offline calibrated parameters predetermined for the application and core_1 (or another core of a different core type), to the runtime statistics measured when core_1 executes the application to obtain another power index and another performance index.

The runtime statistics of multiple cores concurrently executing an application may also be measured and used to calculate power indices and performance indices. For example, if two core_0s concurrently execute an application, the aforementioned runtime statistics for both core may be measured and used, in the aggregate, to calculate the power indices and performance indices for two core_0s executing the application, using the formulation with parameters calibrated for two core_0s. Similar calculations apply when the multiple cores are of more than one core type.

In one embodiment, a power index (or performance index) associated with an operating point may be extrapolated, interpolated or otherwise derived from (e.g., by applying the same scaling factor as) the known power indices (or performance indices) associated with other operating points. For example, after calculating a power index for a given operating point and a given core executing an application, the system may estimate the power index for another operating point of the same given core executing the same application. For example, if the calculated power index for a given operating point and a given core type changes from its default value by a scaling factor SF, the power index for another operating point of the same given core type may also be changed and estimated by the scaling factor F from its default value, where the default value is the value in the power table that is loaded or generated at system start-up. In one embodiment, the system may initially execute the application at a number of operating points and each core type to calculate a number of power indices. The other power indices may be interpolated and/or extrapolated from these calculated power indices, or scaled by the same scaling factor as these calculated power indices. The examples described above with respect to power indices also apply to performance indices.

Figure 6:
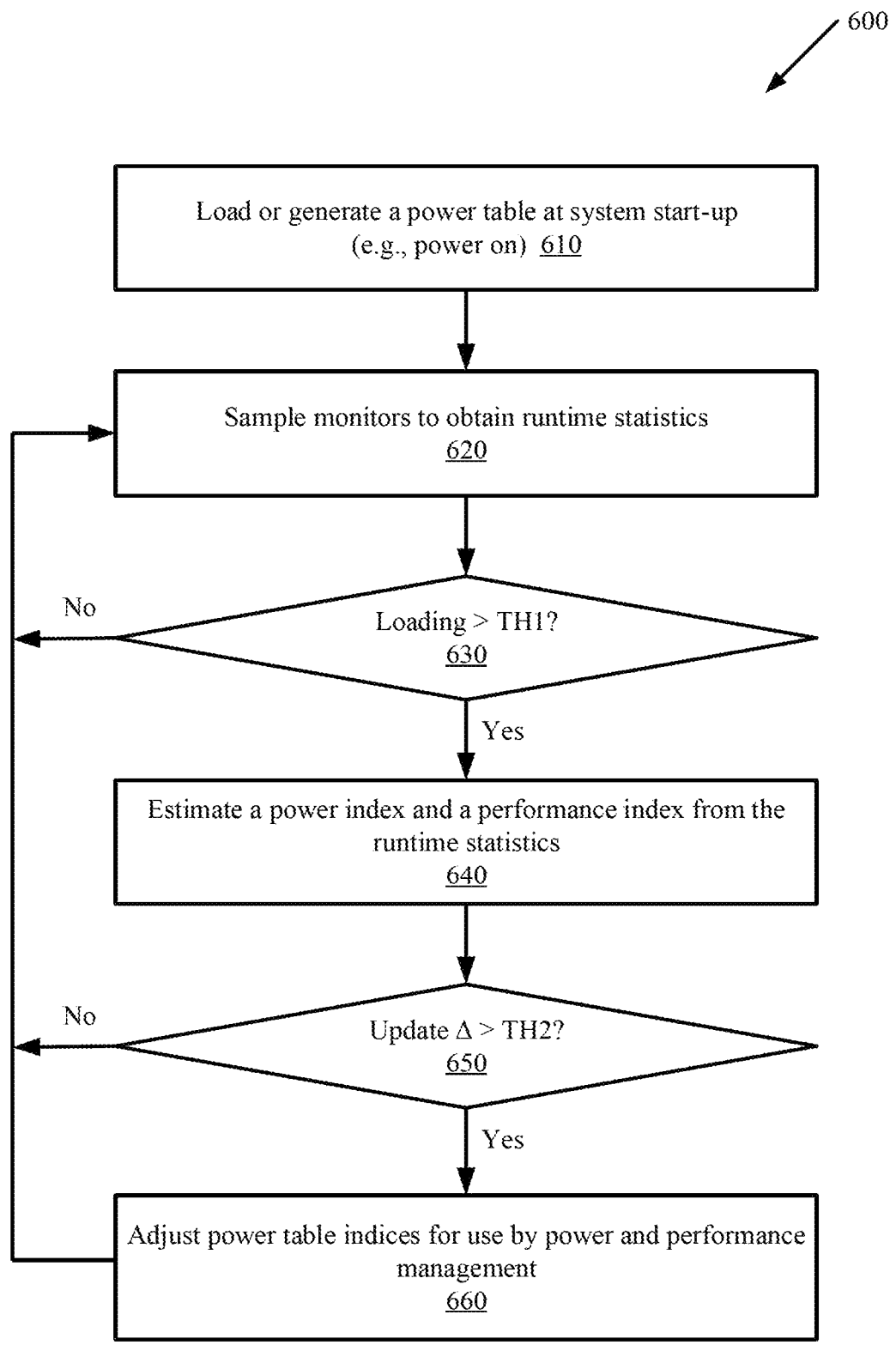
FIG. 6 is a flow diagram illustrating a process for adjusting power table indices according to another embodiment.

FIG. 6 is a flow diagram illustrating a method 600 for power table adjustment according to another embodiment. The method 600 may be performed by the multi-core system 110 of FIG. 1. The method 600 adds thresholds TH1 and TH2 into the method 500 of FIG. 5 to reduce the number of times that the power table 150 is adjusted. Referring also to FIG. 1, when the multi-core system 110 starts up (e.g., powers on) at system boot time at step 610, the system 110 generates the power table 150 according to a predetermined process; alternatively, the system 110 may load the power table from storage into the on-chip memory. At runtime when a core (or cores) executes an application at step 620, the monitors 180 are periodically sampled to determine, for each sampling cycle, the runtime statistics. If at step 630 the loading (e.g., utilization) of the core executing the application is greater than threshold TH1, the controller 170 at step 640 estimates a power index and a performance index for the core (or cores) executing the application based on the runtime statistics. If at step 650 the difference (update 4) between one or more estimated indices and corresponding or more indices in the current power table is greater than threshold TH2, then the controller 170 at step 660 adjusts one or more power table indices (e.g., the power index and/or the performance index) for use by power table management. In one embodiment, the update 4 may be the maximum, average, minimum or other metrics for computing a difference value from the differences between multiple corresponding indices. Then the system 110 returns to step 620 to sample the monitors 180 in the next sampling cycle. If at step 630 the loading of the core (cores) executing the application is not greater than threshold TH1, or if at step 650 the difference between the estimated indices and the current indices is not greater than threshold TH2, then the system 110 returns to step 620 to sample the monitors 180 in the next sampling cycle. In one embodiment, the difference may be calculated by the sum of the power index difference and the performance index difference.

Figure 7:
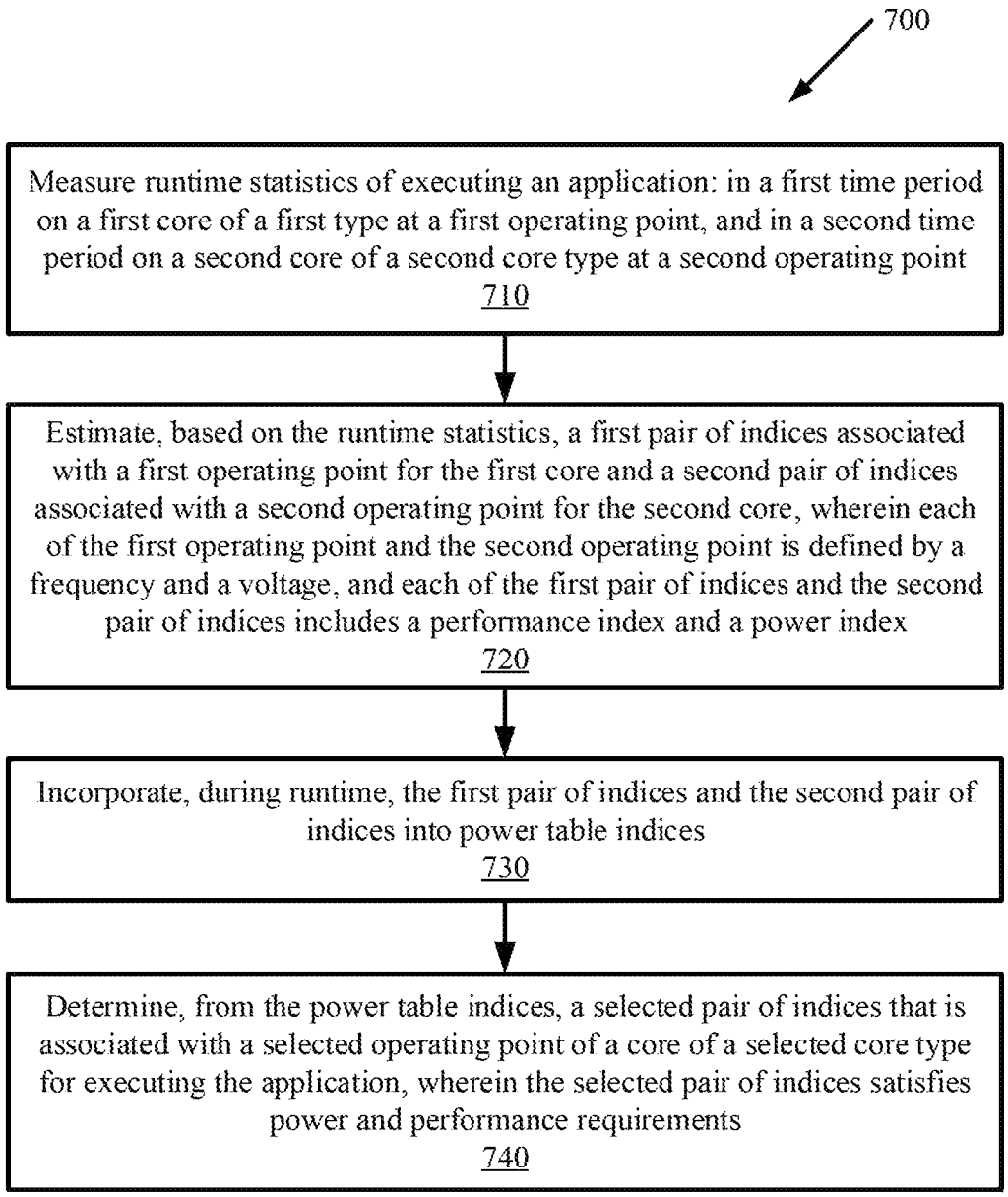
FIG. 7 is a flow diagram illustrating a method for dynamically managing power and performance according to one embodiment.

FIG. 7 is a flow diagram illustrating a method 700 for dynamically managing power and performance in a multi-core system according to one embodiment. The multi-core system may include cores of at least a first core type and a second core type. The method 700 may be performed by the multi-core system 110 of FIG. 1.

The method 700 begins at step 710 with monitors measuring runtime statistics of executing an application. In a first time period the application is executed on the first core at a first operating point, and in a second (different) time period the application is executed on the second core at a second operating point. Based on the runtime statistics, the controller at step 720 estimates a first pair of indices associated with a first operating point for the first core and a second pair of indices associated with a second operating point for the second core. Each of the first operating point and the second operating point is defined by a frequency and a voltage, and each of the first pair of indices and the second pair of indices includes a performance index and a power index. During runtime, the controller at step 730 incorporates the first pair of indices and the second pair of indices into power table indices. Thus, one or more power table indices may be read from the power table and adjusted for power and performance management purposes; the power table content may stay the same or may also be adjusted. A scheduler at step 740 then determines, from the power table indices, a selected pair of indices that is associated with a selected operating point of a core of a selected core type for executing the application, wherein the selected pair of indices satisfies power and performance requirements. In one embodiment, the scheduler selects, from the power table indices, the selected pair of indices that has the least power index (i.e., least power consumption) among pairs of indices whose performance indices satisfying a performance requirement.

The operations of the flow diagrams of FIG. 5-7 has been described with reference to the exemplary embodiments of FIGS. 1 and 2. However, it should be understood that the operations of the flow diagrams of FIGS. 5-7 can be performed by embodiments of the invention other than the embodiments of FIGS. 1 and 2, and the embodiments of FIGS. 1 and 2 can perform operations different than those discussed with reference to the flow diagrams. While the flow diagrams of FIGS. 5-7 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A multi-core system for dynamically managing power and performance, comprising:
    a plurality of cores of at least a first core type and a second core type;
    a plurality of monitors to measure runtime statistics of executing an application in a first time period on a first core of a first type at a first operating point, and in a second time period on a second core of a second core type at a second operating point;
    memory to store a power table which contains multiple pairs of indices; and
    a controller coupled to the cores, the monitors and the memory, the controller operative to:
        calculate, based on the runtime statistics, updates to a first pair of indices associated with a first operating point for the first core and a second pair of indices associated with a second operating point for the second core, wherein each of the first operating point and the second operating point is defined by a frequency and a voltage, and each of the first pair of indices and the second pair of indices includes a performance index and a power index;
        apply, during runtime, the updates to the first pair of indices and the second pair of indices in the power table; and
        determine, from the power table, a selected pair of indices that is associated with a selected operating point of a core of a selected core type for executing the application, the selected pair of indices satisfies power and performance requirements.

2. The system of claim 1, wherein the monitors are further operative to:
    measure, during a sampling cycle, a first number of integer instructions, a second number of floating point instructions, and a third number of instructions in the application executed by each of the first core and the second core.

3. The system of claim 1, wherein the monitors are further operative to:
    measure, during a sampling cycle, a cache hit rate and a memory throughput in the application executed by each of the first core and the second core.

4. The system of claim 1, wherein, when calculating the updates to the first pair of indices and the second pair of indices, the controller is further operative to:
    apply, a formulation with a first set of offline calibrated parameters predetermined for the application and the first core, to the runtime statistics measured when the first core executes the application to obtain the first pair of indices; and
    apply, the formulation with a second set of offline calibrated parameters predetermined for the application and the second core, to the runtime statistics measured when the second core executes the application to obtain the second pair of indices.

5. The system of claim 1, wherein, when determining from the power table, the controller is further operative to:

select, from the power table, the selected pair of indices having the least power index among pairs of indices whose performance indices satisfying a performance requirement.

6. The system of claim 1, wherein, prior to applying the updates to the first pair of indices and the second pair of indices, the controller is further operative to:
in response to a first determination that a workload on a given core that is executing the application does not exceed a first threshold, maintain same indices in the power table for the given core.

7. The system of claim 6, wherein, when applying the updates to the first pair of indices and the second pair of indices, the controller is further operative to:
update the indices for the given core when the workload on the given core exceeds the first threshold, and when a difference value between the updated indices and corresponding one or more indices in the power table is greater than a second threshold.

8. The system of claim 1, wherein the first core and the second core have a same instruction set architecture (ISA) and different microarchitecture for delivering different performance and energy efficiency.

9. The system of claim 1, further comprising a third core of a third core type, wherein the controller is further operative to perform the measure, the calculate, the apply and the determine for the third core.

10. The system of claim 1, wherein, when calculating during runtime, the controller is further operative to:
based on the first pair of indices for the first core, estimate a next pair of indices for the first core, wherein the next pair of indices is associated with a next operating point of the first core.

11. A method for dynamically managing power and performance in a multi-core system including cores of at least a first core type and a second core type, comprising:
measuring runtime statistics of executing an application on the first core at a first operating point and the second core at a second operating point;
calculating, based on the runtime statistics, updates to a first pair of indices associated with a first operating point for the first core and a second pair of indices associated with a second operating point for the second core, wherein each of the first operating point and the second operating point is defined by a frequency and a voltage, and each of the first pair of indices and the second pair of indices includes a performance index and a power index;
applying, during runtime, the updates to the first pair of indices and the second pair of indices in a power table which contains multiple pairs of indices; and
determining, from the power table, a selected pair of indices that is associated with a selected operating point of a core of a selected core type for executing the application, wherein the selected pair of indices satisfies power and performance requirements.

12. The method of claim 11, wherein measuring the runtime statistics further comprises:
measuring, during a sampling cycle, a first number of integer instructions, a second number of floating point instructions, and a third number of instructions in the application executed by each of the first core and the second core.

13. The method of claim 11, wherein measuring the runtime statistics further comprises:
measuring, during a sampling cycle, a cache hit rate and a memory throughput in the application executed by each of the first core and the second core.

14. The method of claim 11, wherein calculating the updates to the first pair of indices and the second pair of indices further comprises:
applying, a formulation with a first set of offline calibrated parameters predetermined for the application and the first core, to the runtime statistics measured when the first core executes the application to obtain the first pair of indices; and
applying, the formulation with a second set of offline calibrated parameters predetermined for the application and the second core, to the runtime statistics measured when the second core executes the application to obtain the second pair of indices.

15. The method of claim 11, wherein determining from the power table further comprises:
selecting, from the power table, the selected pair of indices having the least power index among pairs of indices whose performance indices satisfying a performance requirement.

16. The method of claim 11, wherein, prior to applying the updates to the first pair of indices and the second pair of indices, the method further comprises:
in response to a first determination that a workload on a given core that is executing the application does not exceed a first threshold, maintaining same indices in the power table for the given core.

17. The method of claim 16, wherein applying the updates to the first pair of indices and the second pair of indices further comprises:
updating the indices for the given core when the workload on the given core exceeds the first threshold, and when a difference value between the updated indices and corresponding indices in the power table is greater than a second threshold.

18. The method of claim 11, wherein the first core and the second core have a same instruction set architecture (ISA) and different microarchitecture for delivering different performance and energy efficiency.

19. The method of claim 11, wherein the multi-core system includes at least the first core, the second core and a third core of a third core type, and wherein operations of the measuring, the calculating, the applying and the determining are performed for the first core, the second core and the third core.

20. The method of claim 11, wherein calculating the updates during runtime further comprises:
based on the first pair of indices for the first core, estimating a next pair of indices for the first core, wherein the next pair of indices is associated with a next operating point of the first core.

* * * * *